United States Patent
Han et al.

(10) Patent No.: US 12,311,443 B2
(45) Date of Patent: May 27, 2025

(54) METHOD FOR FORMING METAL SINTERED BODY

(71) Applicant: SEOUL NATIONAL UNIVERSITY R&DB FOUNDATION, Seoul (KR)

(72) Inventors: Heung Nam Han, Seoul (KR); No Jun Kwak, Seoul (KR); Yeon Ju Oh, Seoul (KR); Guen Sik Min, Incheon (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 400 days.

(21) Appl. No.: 17/909,527

(22) PCT Filed: Jan. 20, 2021

(86) PCT No.: PCT/KR2021/095007
§ 371 (c)(1),
(2) Date: Sep. 6, 2022

(87) PCT Pub. No.: WO2021/187964
PCT Pub. Date: Sep. 23, 2021

(65) Prior Publication Data
US 2023/0024857 A1   Jan. 26, 2023

(30) Foreign Application Priority Data
Mar. 19, 2020   (KR) .......... 10-2020-0033808

(51) Int. Cl.
*B22F 3/10*   (2006.01)
*B22F 3/03*   (2006.01)
*B22F 3/105*   (2006.01)

(52) U.S. Cl.
CPC ............ *B22F 3/1003* (2013.01); *B22F 3/03* (2013.01); *B22F 3/105* (2013.01); *B22F 2003/1051* (2013.01); *B22F 2301/20* (2013.01); *B22F 2998/10* (2013.01)

(58) Field of Classification Search
CPC .......... B22F 3/1003; B22F 3/03; B22F 3/105; B22F 2003/1051; B22F 2301/20; B22F 2998/10
See application file for complete search history.

(56) References Cited

U.S. PATENT DOCUMENTS

| | | | |
|---|---|---|---|
| 4,146,438 A | 3/1979 | de Nora | |
| 7,226,492 B2 | 6/2007 | Mahot | |
| 10,857,594 B2 | 12/2020 | Choi | |
| 11,174,538 B2 | 11/2021 | Kaner et al. | |
| 2015/0023837 A1* | 1/2015 | Ohashi | C23C 14/14 420/430 |

(Continued)

FOREIGN PATENT DOCUMENTS

| | | |
|---|---|---|
| JP | 2000239071 A | 9/2000 |
| JP | 2009129636 A | 6/2009 |

(Continued)

*Primary Examiner* — Ricardo D Morales
(74) *Attorney, Agent, or Firm* — Bridgeway IP Law Group, PLLC; Sang Ho Lee; Hyun Woo Shin

(57) ABSTRACT

Provided is a method of forming a sintered metal, the method including a first step of inserting tungsten (W) powder in a graphite mold, a second step of interposing tantalum (Ta) foil between the W powder and the graphite mold, and a third step of forming sintered W from the W powder through a sintering process.

7 Claims, 7 Drawing Sheets

(56) References Cited

U.S. PATENT DOCUMENTS

2018/0326483 A1* 11/2018 Choi .................... B22F 3/1017

FOREIGN PATENT DOCUMENTS

| | | |
|---|---|---|
| KR | 1019870000095 | 2/1987 |
| KR | 20080102786 A | 11/2008 |
| KR | 20140129249 A | 11/2014 |
| KR | 20180124610 A | 11/2018 |
| KR | 20190116377 A | 10/2019 |
| KR | 20200019387 A | 2/2020 |
| WO | WO-2012128708 A1 * 9/2012 .............. B22F 3/105 |

* cited by examiner

METHOD FOR FORMING METAL SINTERED BODY

TECHNICAL FIELD

The present invention relates to a method of forming a sintered metal and, more particularly, to a method of forming a sintered metal capable of suppressing carburization and oxidation.

BACKGROUND ART

Tungsten (W) (atomic number: 74, melting point: 3,410° C.) is most resistant to heat from among metal elements, is a material usable in harsh environments requiring high heat and wear resistances, and is being widely applied in various industrial fields as a facing material. In particular, due to a low coefficient of thermal expansion and excellent high-temperature mechanical properties, W is currently attracting much attention as a material used in harsh environments, e.g., an aircraft structural material, a military structural material, or a nuclear fusion facing material. However, due to a high ductile-brittle transition temperature (DBTT), W exhibits highly brittle behavior at room temperature and thus application thereof is limited. When W includes micro oxide and carbide serving as propagation paths of cracks, the high DBTT temperature and room temperature brittle properties thereof further deteriorate. W easily forms carbide and oxide at high temperature, and easily forms a brittle phase such as $W_{1-x}C_x$ or $W_{1-y}O_y$. Therefore, to compensate for the above disadvantages, contamination by impurities (e.g., carbon (C) or oxygen (O)) in a process of producing a material made of W need to be minimized. However, it is quite difficult to precisely control the impurities in the process.

DETAILED DESCRIPTION OF THE INVENTION

Technical Problem

The present invention provides a method of forming a sintered metal, the method being quite simple compared to a general method and being capable of greatly saving energy during a process, by using thermodynamic and kinetic balance. However, the scope of the present invention is not limited thereto.

Technical Solution

According to an aspect of the present invention, there is provided a method of forming a sintered metal, the method including a first step of inserting powder of a first metal in a mold, a second step of interposing foil of a second metal between the powder and the mold, and a third step of forming a sintered metal from the powder through a sintering process, wherein the second metal has higher carbon (C) and oxygen (O) affinities than the first metal, a diffusivity of C in a carbide of the second metal is lower than a diffusivity of C in the second metal, the diffusivity of C in the second metal is higher than a diffusivity of C in the first metal, and a diffusivity of C in a carbide of the first metal is higher than the diffusivity of C in the carbide of the second metal.

In the method of forming the sintered metal, the third step includes forming the carbide of the second metal in the foil to prevent formation of the carbide of the first metal based on diffusion of C into the sintered metal due to carburization, and wherein the third step includes forming an oxide of the second metal in the foil to prevent formation of an oxide of the first metal based on diffusion of O into the sintered metal.

In the method of forming the sintered metal, a diffusion rate of C in the foil is reduced after the carbide of the second metal is formed in the third step.

In the method of forming the sintered metal, the carbide of the second metal is formed at an interface of the foil adjacent to the sintered metal.

In the method of forming the sintered metal, the mold includes a graphite mold, and the sintering process includes a spark plasma sintering (SPS) process performed in a vacuum chamber having an internal partial pressure of O.

Provided is a method of forming a sintered metal, according to another embodiment of the present invention.

According to another aspect of the present invention, there is provided a method of forming a sintered metal, the method including a first step of inserting tungsten (W) powder in a graphite mold, a second step of interposing tantalum (Ta) foil between the W powder and the graphite mold, and a third step of forming sintered W from the W powder through a sintering process.

In the method of forming the sintered metal, the third step includes forming Ta carbide ($Ta_2C$) in the Ta foil to prevent formation of W carbide based on diffusion of carbon (C) into the sintered W due to carburization, and wherein the third step includes forming Ta oxide ($Ta_2O_5$) in the Ta foil to prevent formation of W oxide based on diffusion of oxygen (O) into the sintered W.

In the method of forming the sintered metal, to prevent chemical bonding between W and the graphite mold in the sintering process and separate the sintered metal from the graphite mold after the sintering process, the second step includes further interposing C-containing foil between the Ta foil and the graphite mold.

In the method of forming the sintered metal, the sintering process includes a spark plasma sintering (SPS) process performed in a vacuum chamber having an internal partial pressure of oxygen.

Advantageous Effects

According to the present invention, when various materials are produced using a spark plasma sintering (SPS) process, impurities introducible in the process may be effectively suppressed by using thermodynamic and kinetic relations. For example, a method of forming a sintered metal, the method being capable of suppressing carburization/oxidation caused when the sintered metal is produced using a SPS process, may be provided. The above-described effects of the present invention are merely examples, and the scope of the present invention is not limited thereto.

MODE OF THE INVENTION

Figure 1:
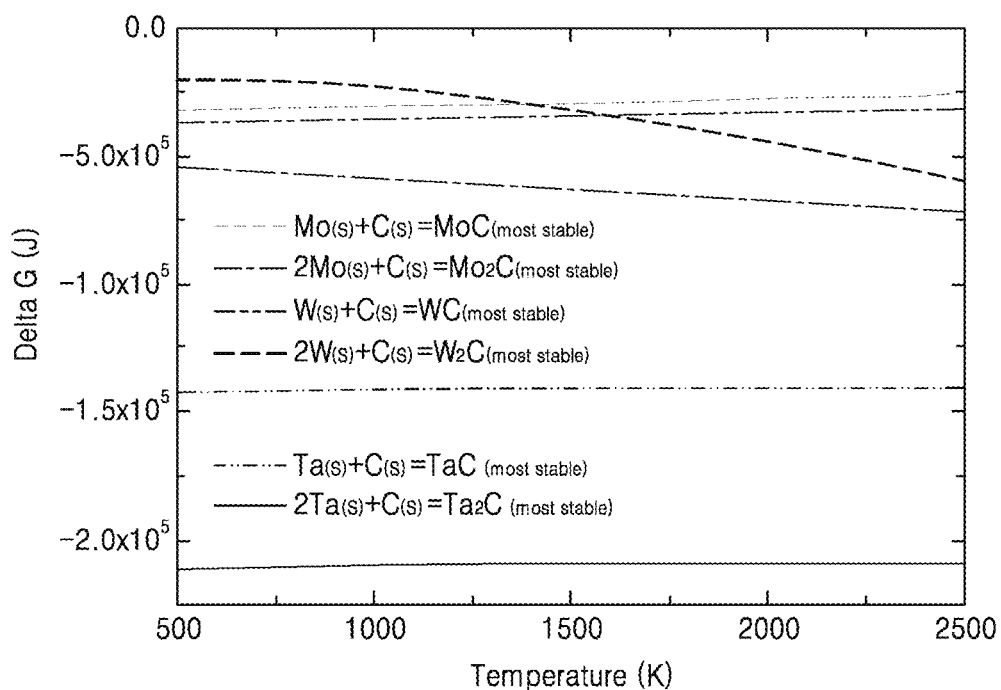
FIG. 1 is a graph showing thermodynamic relations for compounds formed between tungsten (W), molybdenum (Mo), tantalum (Ta), and carbon (C)(graphite)

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. Like reference numerals denote like elements throughout. Various elements and regions are schematically illustrated in the drawings. Therefore, the scope of the present invention is not limited by the sizes or distances shown in the attached drawings.

A method of forming a sintered metal, according to an embodiment of the present invention, includes a first step of inserting powder of a first metal in a mold, a second step of interposing foil of a second metal between the powder and the mold, and a third step of forming a sintered metal from the powder through a sintering process, wherein the second metal has higher carbon (C) and oxygen (O) affinities than the first metal, and a diffusivity of C in a carbide of the second metal is lower than a diffusivity of C in the second metal. Furthermore, the diffusivity of C in the second metal is higher than a diffusivity of C in the first metal, and a diffusivity of C in a carbide of the first metal is higher than the diffusivity of C in the carbide of the second metal. For example, the first metal may include tungsten (W), and the second metal may include tantalum (Ta) or molybdenum (Mo).

In the method of forming the sintered metal, according to an embodiment of the present invention, the third step may include forming the carbide of the second metal in the foil to prevent formation of the carbide of the first metal based on diffusion of C into the sintered metal due to carburization. That is, the formation of the carbide of the first metal based on the diffusion of C into the sintered metal may be prevented by forming the carbide of the second metal in the foil due to carburization in the third step. The carbide of the second metal may also be formed at an interface of the foil adjacent to the sintered metal.

In the method of forming the sintered metal, according to an embodiment of the present invention, the third step may include forming an oxide of the second metal in the foil to prevent formation of an oxide of the first metal based on diffusion of O into the sintered metal. That is, the formation of the oxide of the first metal based on the diffusion of O into the sintered metal may be prevented by forming the oxide of the second metal in the foil due to oxidation in the third step.

In the method of forming the sintered metal, according to an embodiment of the present invention, because the diffusivity of C in the carbide of the second metal is lower than the diffusivity of C in the second metal, a diffusion rate of C in the foil may be reduced after the carbide of the second metal is formed in the third step. Furthermore, because the diffusivity of C in the carbide of the second metal is lower than the diffusivity of C in the second metal, the more the carbide of the second metal is formed in the third step, the more the diffusion rate of C in the foil may be reduced.

In the method of forming the sintered metal, according to an embodiment of the present invention, the mold may include a graphite mold, and the sintering process may include a spark plasma sintering (SPS) process performed in a vacuum chamber having an internal partial pressure of O.

Test examples for specifically describing the above-described method of forming the sintered metal, according to an embodiment of the present invention, will now be described. However, the following test examples are merely for better understanding of the present invention, and the scope of the present invention is not limited thereto.

These test examples are aimed to derive a method of forming a sintered metal by suppressing carburization/oxidation caused by, for example, a graphite mold and a low partial pressure of oxygen in a vacuum chamber when a SPS process is used. For example, in an embodiment of the method of forming the sintered metal, impurities (e.g., C and O) may be controlled using thermodynamic and kinetic balance between W to be sintered and metal foil for suppressing carburization/oxidation.

In an embodiment of the present invention, a metal suitable for use as carburization/oxidation suppression foil may be selected from among metals having a thermodynamic stability with C/O, which is similar to or higher than that of W. An element for stably forming a carbide and an oxide may be selected from groups IVa, Va, and VIa in the periodic table and, considering that a SPS temperature of W is 1600° C. to 2000° C. (or 1873 K to 2273 K), for stable use, Ta of group V a and Mo and W of group VIa, which have a melting point higher than or equal to 2500° C. (or 2773 K), are used as a carburization/oxidation suppression barrier.

Figure 2:
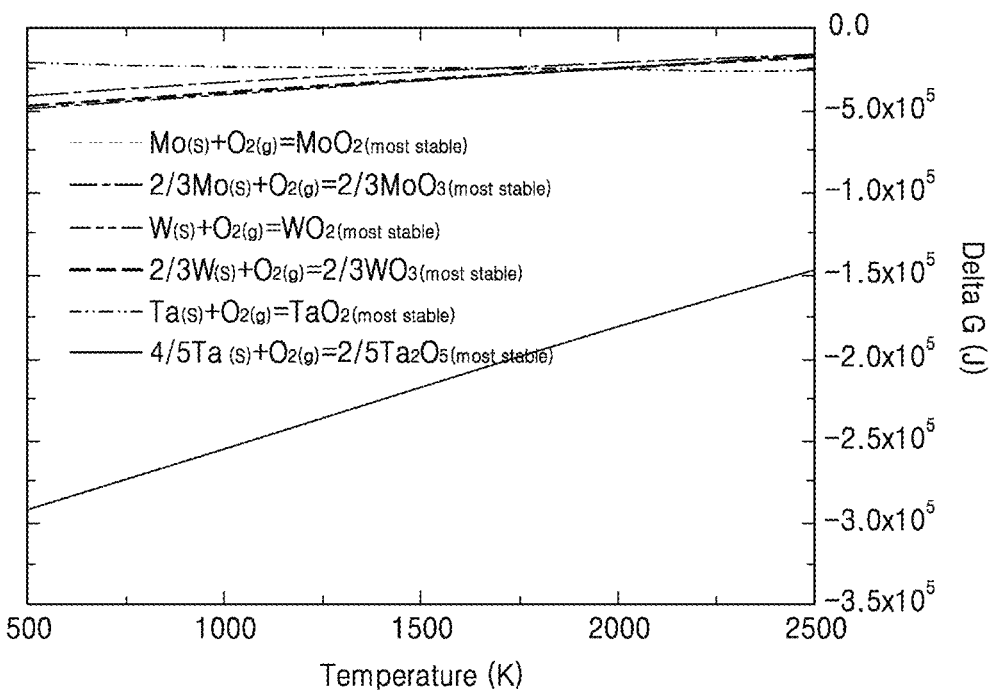
FIG. 2 is a graph showing thermodynamic relations for compounds formed between W, Mo, Ta, and $O_2(g)$.

FIG. 1 is a graph showing thermodynamic relations for compounds formed between W, Mo, Ta, and C(graphite), and FIG. 2 is a graph showing thermodynamic relations for compounds formed between W, Mo, Ta, and $O_2(g)$.

Referring to FIGS. 1 and 2, when a Gibbs free energy change (or delta G) of the vertical axis has a negative value, it may be regarded that reaction occurs spontaneously, and a larger value thereof indicates a higher stability. As such, it is shown that thermodynamic stabilities of W and Mo with C(graphite) or $O_2(g)$ are equal or similar to the thermodynamic stability of W powder with C(graphite) or $O_2(g)$.

Meanwhile, it is also shown that a thermodynamic stability of Ta with C(graphite) or $O_2(g)$ is higher than the thermodynamic stability of W powder with C(graphite) or $O_2(g)$. That is, it may be understood that Ta has higher C and O affinities than W.

Table 1 shows carburization/oxidation suppression foils applied to a method of forming a sintered metal, according to the test examples of the present invention. A thickness of $C_{graphite}$ foil is 250 μm, a thickness of W foil is 25 μm, a thickness of Mo foil 25 μm, and a thickness of Ta foil is 25 μm.

Figure 3:
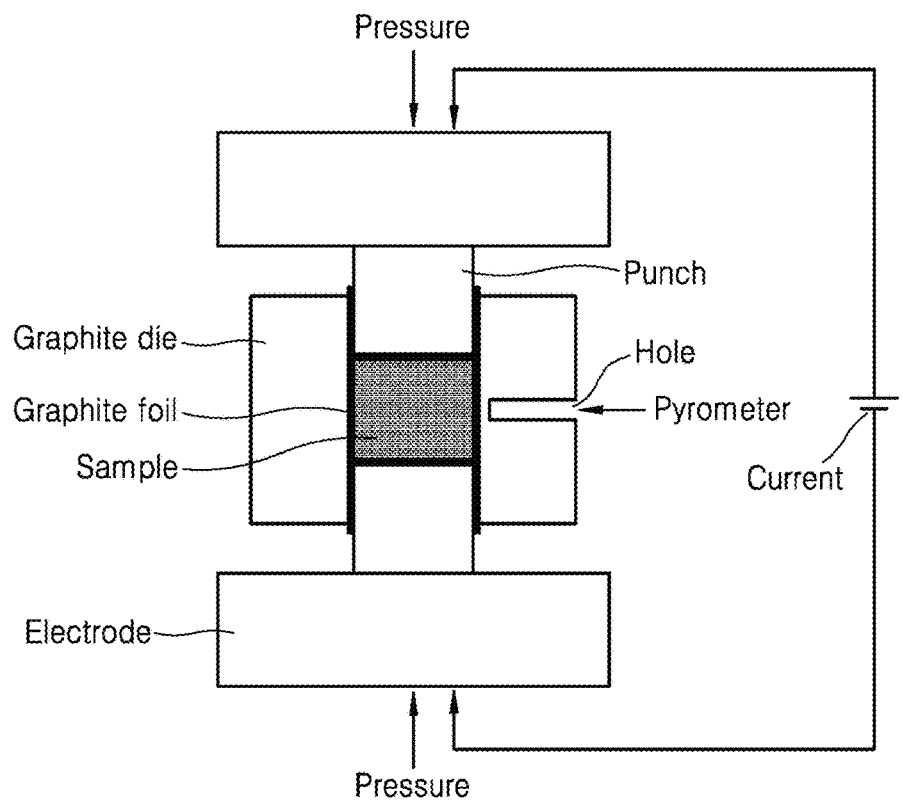
FIG. 3 illustrates a sintering system applied to a method of forming a sintered metal, according to Test Example 1 of the present invention.
Figure 4:
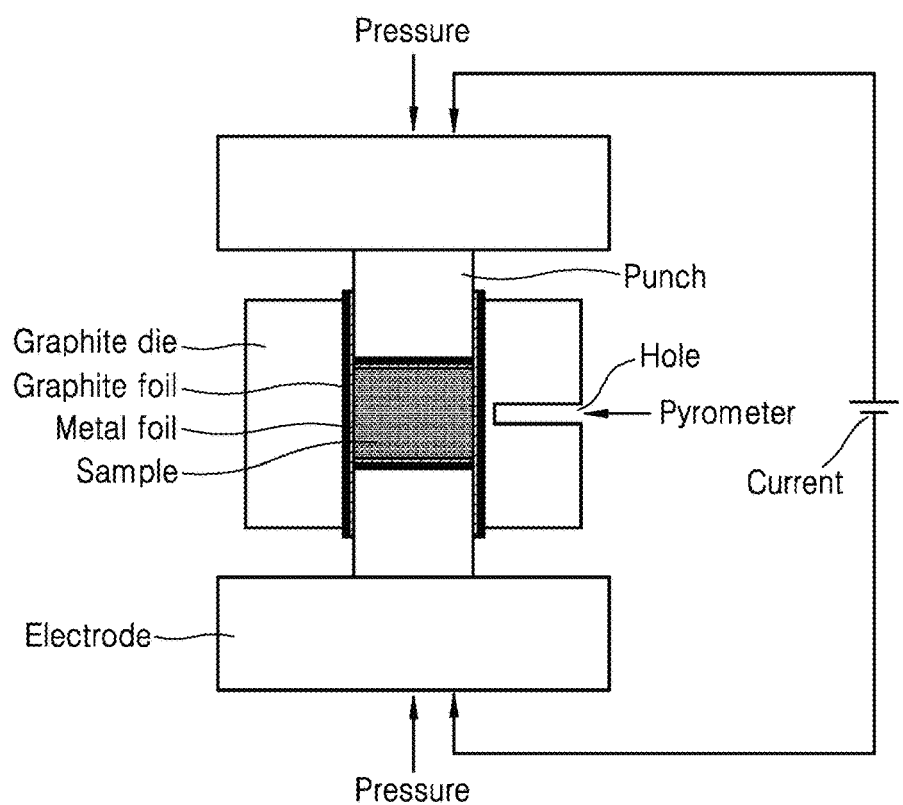
FIG. 4 illustrates a sintering system applied to a method of forming a sintered metal, according to Test Examples 2 to 4 of the present invention.

FIG. 3 illustrates a sintering system applied to a method of forming a sintered metal, according to Test Example 1 of the present invention, and FIG. 4 illustrates a sintering system applied to a method of forming a sintered metal, according to Test Examples 2 to 4 of the present invention. Referring to FIGS. 3 and 4, in a SPS system, metal powder (or a sample) is inserted between a pair of graphite molds (or graphite dies), and a current and a pressure are applied through electrodes connected to a punch. Graphite foil and/or metal foil may be interposed between the graphite mold and the metal powder.

TABLE 1

| Test Example | Carburization/oxidation suppression foil |
|---|---|
| Test Example 1 | $C_{graphite}$ foil |
| Test Example 2 | $C_{graphite}$ foil + W foil |
| Test Example 3 | $C_{graphite}$ foil + Mo foil |
| Test Example 4 | $C_{graphite}$ foil + Ta foil |

Test Example 1 shows a case in which no additional carburization/oxidation suppression barrier other than $C_{graphite}$ foil is used, Test Example 2 shows a case in which the carburization/oxidation suppression barrier is made of the same material as sintered W, Test Example 3 shows a case in which the carburization/oxidation suppression barrier has a thermodynamic stability similar to that of the sintered W, and Test Example 4 shows a case in which the carburization/oxidation suppression barrier has a thermodynamic stability higher than that of the sintered W. In the test examples, $C_{graphite}$ foil is applied to every test example to prevent chemical bonding between the graphite mold and W and easily separate the sintered W from the graphite mold.

A SPS process was performed using the above-mentioned foils and W powder (0.5 μm). Because diffusion of C and O is related to the Fick's law and a diffusivity D according to the Fick's law increases exponentially with temperature, it was expected that the traces of internal diffusion of C or O would appear distinctly in proportion to a sintering temperature and, for verification, sintered W was produced by performing sintering at a temperature of 1700° C. to 1900° C. (or 1973 K to 2173 K) for 10 minutes while maintaining a pressure of 65 MPa and a change in microstructure was observed using scanning electron microscopy (SEM).

Carburization/oxidation caused by a graphite mold and a low partial pressure of O in a vacuum chamber occurs in a very small amount, and quantification thereof requires very high and cutting-edge technology and very high-level analytical sensitivity. Thus, O and C in the sintered W may not be easily quantified. Therefore, in the test examples, C and O diffused into the sintered W were traced by observing a microstructure on a cylindrical surface.

Figures 5, 6:
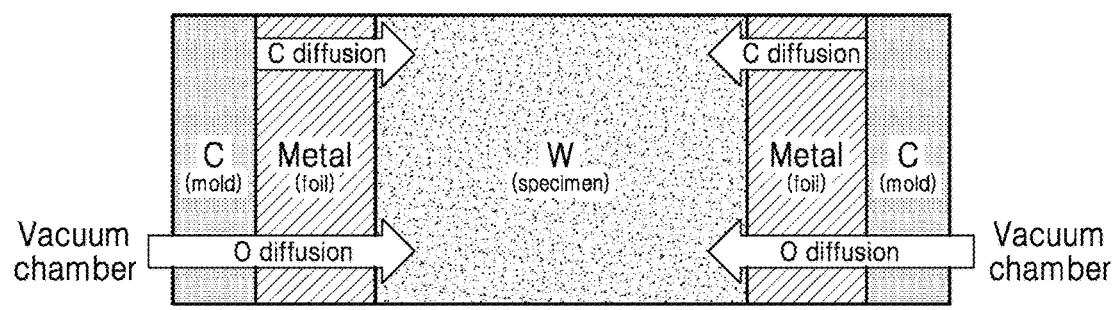
FIG. 5 shows diffusion paths of carbon/oxygen, a side surface of a graphite mold for spark plasma sintering (SPS), and a cylindrical surface for observation of a microstructure in a method of forming a sintered metal, according to test examples of the present invention.
FIG. 6 shows scanning electron microscopy (SEM) (back-scattered electron (BSE) mode) images of a yellow dotted box (i.e., the cylindrical surface) illustrated in FIG. 5.

FIG. 5 shows diffusion paths of C/O, a side surface of a graphite mold for SPS, and a cylindrical surface for observation of a microstructure in a method of forming a sintered metal, according to the test examples of the present invention.

Referring to FIG. 5, it is shown that powder of a first metal (or a specimen) is inserted in a graphite mold, and foil of a second metal is interposed between the powder (or the specimen) and the graphite mold. According to an embodiment of the present invention, a sintered metal capable of suppressing carburization/oxidation may be produced using SPS. Specifically, contamination by impurities, e.g., internal penetration of C and O, which is caused by a graphite mold for SPS and an internal partial pressure of O of a vacuum chamber, may be minimized by using metal foil as a barrier. Sintered W to which the above-described technique is applied may be produced because the metal foil used as a barrier attracts C and O and suppresses internal diffusion/penetration thereof. Therefore, to apply the above-described technique, thermodynamic stability and kinetic balance between the metal foil to be used as a barrier and the metal powder (or the specimen) to be sintered are very critical. The current embodiment shows that the impurities may be effectively controlled using thermodynamic and kinetic relations between the metal powder (or the specimen) and the metal foil used as a barrier.

When a sintered metal is produced using a SPS process, a graphite foil may be inserted and used to suppress chemical reaction between a graphite mold and W. In this case, using graphite foil, diffusion of C into W and penetration of O into W due to a low partial pressure of O in a vacuum chamber may not be suppressed. In a method of forming a sintered metal, according to an embodiment of the present invention, sintered W capable of effectively suppressing carburization and oxidation by using metal foil in addition to graphite foil to sinter W may be provided. The thermodynamic and kinetic concept of the present invention is not limited to W and is expected to be widely used to sinter various materials.

Figure 7:
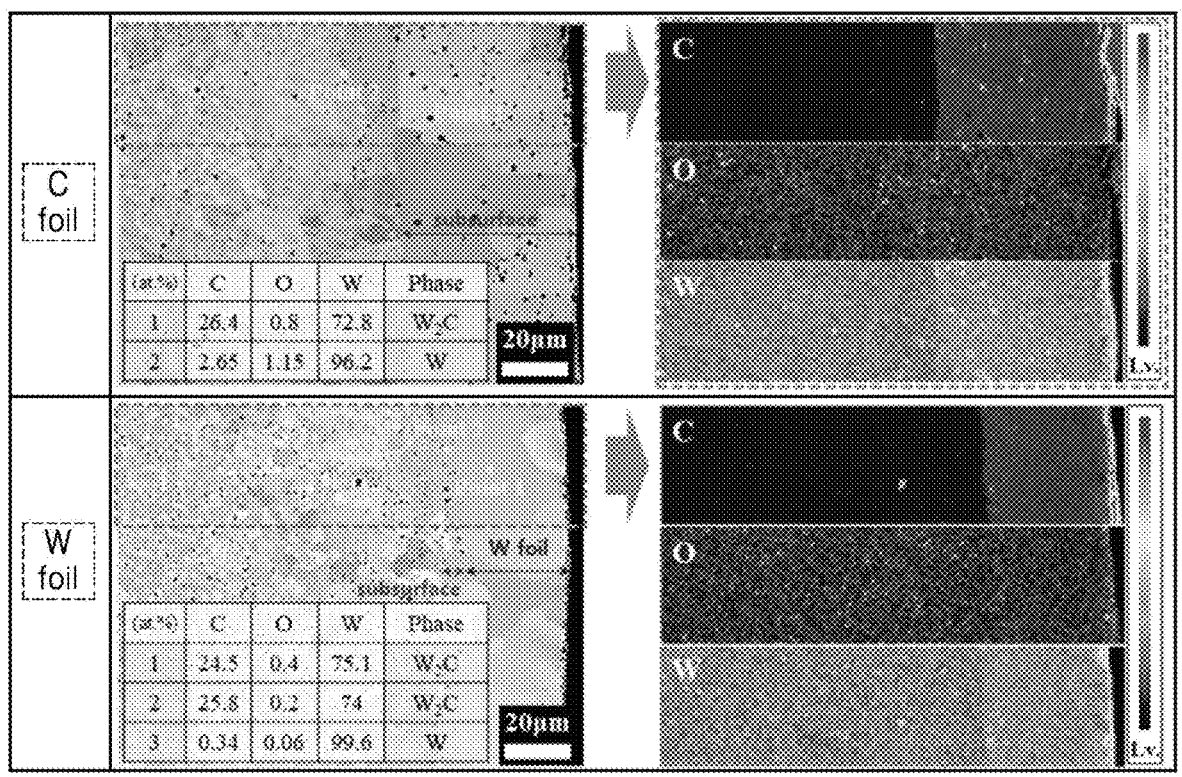
FIGS. 7 and 8 show field-emission electron probe microanalysis (FE-EPMA) quantitative analysis and mapping results of test examples of the present invention.
Figure 8:
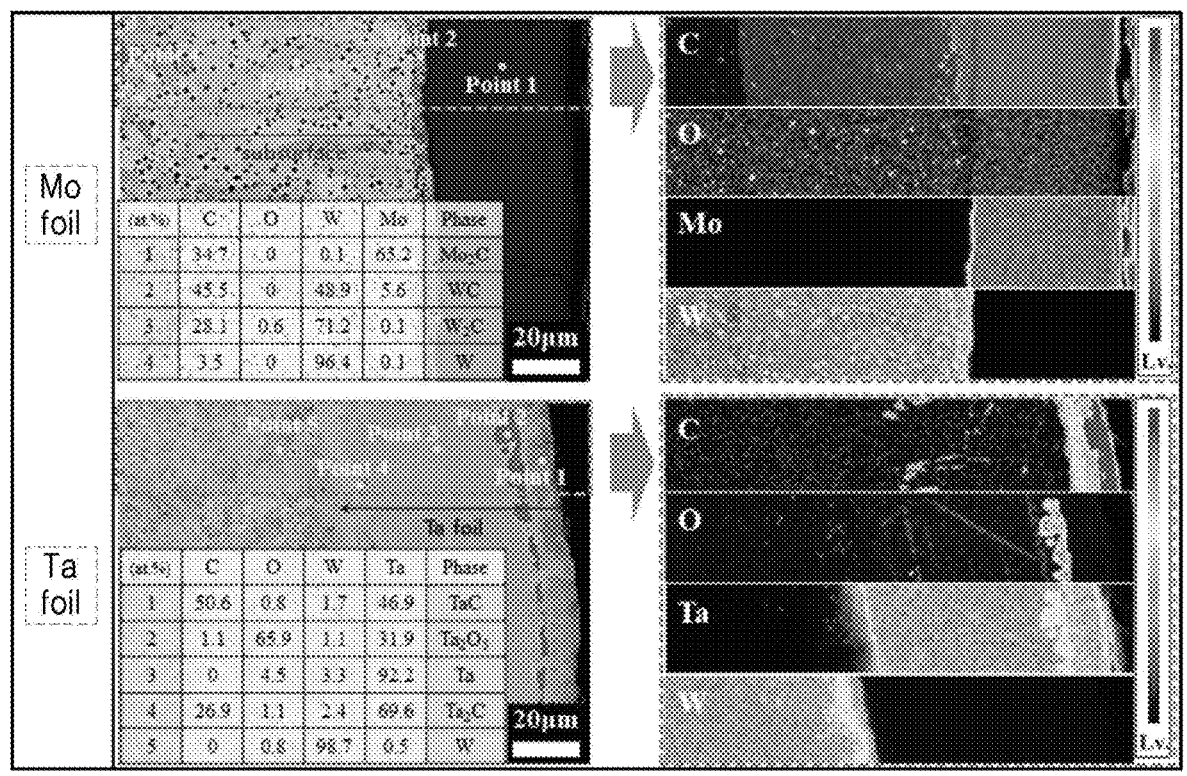

FIG. 6 shows SEM (backscattered electron (BSE) mode) images of a yellow dotted box (i.e., the cylindrical surface) illustrated in FIG. 5, and FIGS. 7 and 8 show field-emission electron probe microanalysis (FE-EPMA) quantitative analysis and mapping results of the test examples of the present invention.

Referring to FIGS. 5 and 6, it is shown that, in Test Examples 1, 2, and 3, a so-called 'subsurface' is formed on the cylindrical surface of the sintered W at all sintering temperatures. It is also shown that the subsurface is increased in thickness in proportion to the sintering temperature. The subsurface is regarded as a region into which C and O are diffused and interacted, and specific phase analysis thereof is performed through FE-EPMA as shown in FIGS. 7 and 8. However, Test Example 4 using Ta foil as a barrier does not exhibit a subsurface and thus shows that Ta foil may be effectively used as carburization/oxidation suppression foil. Referring to FIG. 8, various secondary phases are observed in Ta foil, and the difference in phase implementation depending on the type of foil and thermodynamic and kinetic relations thereof will now be described in detail based on the following FE-EPMA results and thermodynamic analysis.

Referring to FIGS. 7 and 8, to precisely analyze the subsurfaces and the secondary phases, EPMA quantitative analysis (or point analysis) was performed on the results obtained by performing sintering at a temperature of 1700° C. (or 1973 K) for 10 minutes. FE-EPMA analysis was performed using wavelength-dispersive X-ray spectroscopy (WDS) having high analytical sensitivity. The results show that a phase of $W_2C$ is exhibited as the phase of the subsurface when C foil, W foil, and Mo foil are used. As such, it is shown that the subsurface is a phase formed due to internal diffusion of C. Similar microstructures are exhibited when C foil and W foil are used as a barrier, but the W foil barrier delays diffusion to exhibit a small thickness of the $W_2C$ phase. A microstructure in which W foil is initially transformed to $W_2C$ and then W powder is transformed to $W_2C$ and combined with W foil to grow is implemented. When Mo foil is used as a barrier, deeper internal diffusion of C is exhibited compared to the case when W foil is used as a barrier, and a thickness thereof is similar to that of the case when C foil is used. As such, it is shown that Mo foil used as a barrier does not effective suppress carburization.

Unlike this, when Ta foil is used, a subsurface caused by internal diffusion of C is not found and various phases are formed in Ta foil (e.g., point 1, point 2, and point 4 in Ta foil). When Ta foil is used, it is shown that Ta foil effectively suppresses internal diffusion of C as a barrier. A microstructure in which Ta carbide ($Ta_2C$) formed at point 4 in Ta foil is positioned at an interface with W to prevent further internal diffusion of C is exhibited. The above EPMA quantitative analysis results show a similar tendency to the mapping image results.

Oxygen (O) is shown in dark gray at point 2 of Ta foil, and it is understood that Ta suppresses internal diffusion of O like carbon (C). Unlike this, when W, Mo, or C foil is applied, an O-rich zone is not shown on the microstructure and it may be regarded that internal diffusion of O is not suppressed. Therefore, it is shown that Ta foil is effective in suppressing internal diffusion of C and O and, because the behavior of a microstructure change is complexly derived not only from thermodynamic information but also from kinetic relations, a reason for the microstructure change will now be found based on diffusivities of C in metals and carbides, solid solubilities of C in metals, and an Ellingham diagram. The Ellingham diagram may be used to easily compare relative reducibilities or oxidizabilities of various solid phases.

Figure 9:
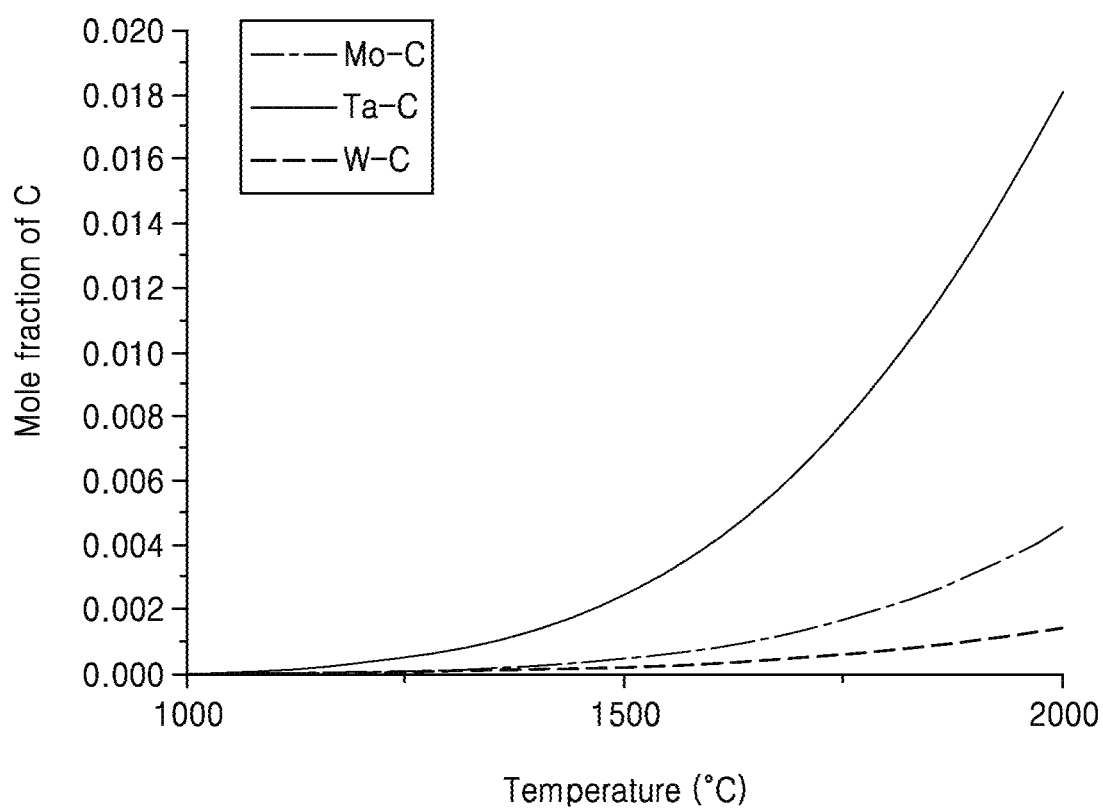
FIG. 9 is a graph showing solid solubilities of C in a method of forming a sintered metal, according to test examples of the present invention.
Figure 10:
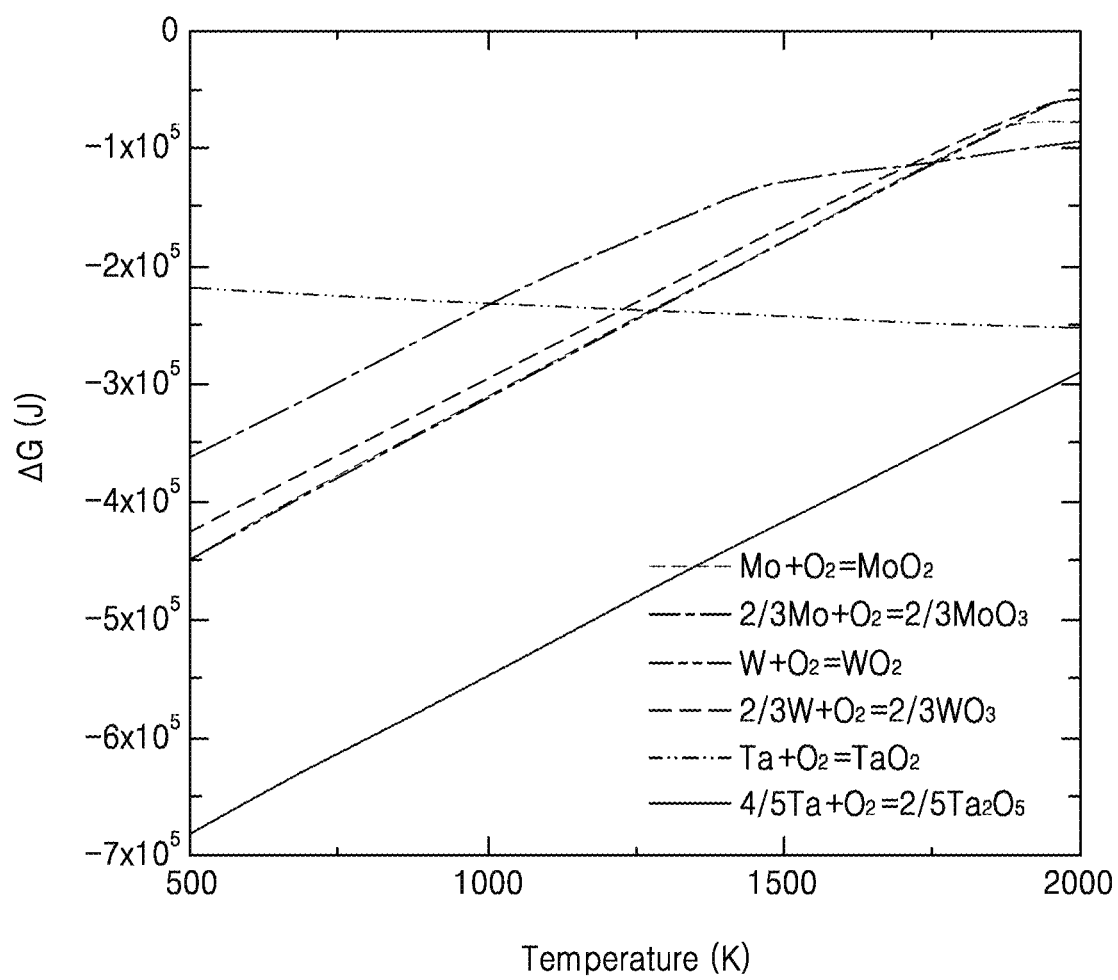
FIG. 10 is an Ellingham diagram of Mo, Ta, and W in a method of forming a sintered metal, according to test examples of the present invention.

FIG. 9 is a graph showing solid solubilities of C in a method of forming a sintered metal, according to the test examples of the present invention, and FIG. 10 is an Ellingham diagram of Mo, Ta, and W in a method of forming a sintered metal, according to the test examples of the present invention.

The present inventors have found that the diffusivities of C in metals are Mo>Ta>W and the diffusivities of C in carbides are Mo>W>Ta. The delta G values for forming carbides, which are described in relation to FIG. 1, are found as Ta>Mo>W. That is, Ta has the highest C affinity (from a thermodynamic point of view) and, after a carbide ($Ta_2C$) is formed, a diffusion rate of C in $Ta_2C$ is the lowest. Referring to FIG. 9, Ta foil has a significantly high solid solubility of C and thus may contain more C under the same sintering condition. Therefore, Ta may be easily transformed to $Ta_2C$, and effectively prevent diffusion of C into the sintered W. Unlike this, in the case of Mo foil, although the thermodynamic stability is similar to that of W, because the diffusivities in metal and carbide are very high and the solid solubility of C in Mo foil is low, C may permeate easily and thus the effect as a diffusion barrier is reduced.

FIG. 10 shows that Ta has a very high oxygen (O) affinity at a vacuum level of $10^{-5}$ atm. This feature is equally exhibited at all vacuum levels higher than or equal to a vacuum level for sintering (about $10^{-2}$ atm). The result means that an oxide is observed in Ta, and it may be understood that the oxide effectively suppresses diffusion of O into W. Unlike this, an O-rich zone is not observed in the other foils. Except for Ta, W and Mo have similar O affinities. Therefore, it may be understood that oxygen (O) is easily diffused into W through a barrier. For this reason, it may be inferred that oxygen (O) is uniformly spread inside as in the EPMA results.

A method of forming a sintered material, the method being capable of suppressing carburization/oxidation caused by a graphite mold and an internal partial pressure of O of a vacuum chamber when a SPS process is used, is described above. Foil used in the present invention may be selected from among groups IVa, V a, and VIa in the periodic table, which thermodynamically form carbides and oxides well to serve as a carburization/oxidation barrier, and foil having higher O and C affinities than a material to be sintered may be selected. Furthermore, it is verified that a diffusivity of C needs to be sufficiently reduced after a carbide is formed in the carburization suppression foil, and diffusion of C into the sintered material may be minimized when a solid solubility of C of the carburization suppression foil is sufficient.

When sintered W is produced using the current embodiment, formation of micro carbide and oxide in the sintered W may be effectively suppressed and thus the sintered W may be used in various fields such as national defense weapons, propulsion engines of aircraft rockets, and nuclear fusion. Furthermore, in addition to W, the current embodiment may also be applied to sintering of various materials to reduce contents of C and O based on thermodynamic relations.

While the present invention has been particularly shown and described with reference to embodiments thereof, it will be understood by one of ordinary skill in the art that various changes in form and details may be made therein without departing from the scope of the present invention as defined by the following claims.

INDUSTRIAL APPLICABILITY

Based on a method of forming a sintered metal, according to an embodiment of the present invention, when various sintered materials are produced using a spark plasma sintering (SPS) process, impurities introducible in the process may be effectively suppressed by using thermodynamic and kinetic relations.

The invention claimed is:

1. A method of forming a sintered metal, the method comprising:
   inserting tungsten (W) powder in a graphite mold;
   interposing tantalum (Ta) foil between the W powder and the graphite mold; and
   forming sintered W from the W powder through a sintering process, the sintering process comprising a spark plasma sintering (SPS) process,
   wherein the forming the sintered W from the W powder through the sintering process comprises:
      forming Ta carbide ($Ta_2C$) in the Ta foil to prevent formation of W carbide based on diffusion of carbon (C) into the sintered W due to carburization; and
      forming Ta oxide ($Ta_2O_5$) in the Ta foil to prevent formation of W oxide based on diffusion of oxygen (O) into the sintered W.

2. The method of claim 1, wherein the sintering process comprises the spark plasma sintering (SPS) process performed in a vacuum chamber.

3. The method of claim 1, wherein a thickness of the Ta foil is 25 µm.

4. The method of claim 1, wherein the Ta foil has a high solid solubility of C.

5. The method of claim 1, wherein the Ta foil has a high O affinity at a vacuum level of $10^{-5}$ atm.

6. The method of claim 1, wherein the Ta foil has a high O affinity at all levels higher than or equal to a vacuum level for sintering, the vacuum level for sintering being $10^{-2}$ atm.

7. The method of claim 1, wherein a foil used is selected from among groups IVa, Va, and VIa of a periodic table.

* * * * *